Figure 1:
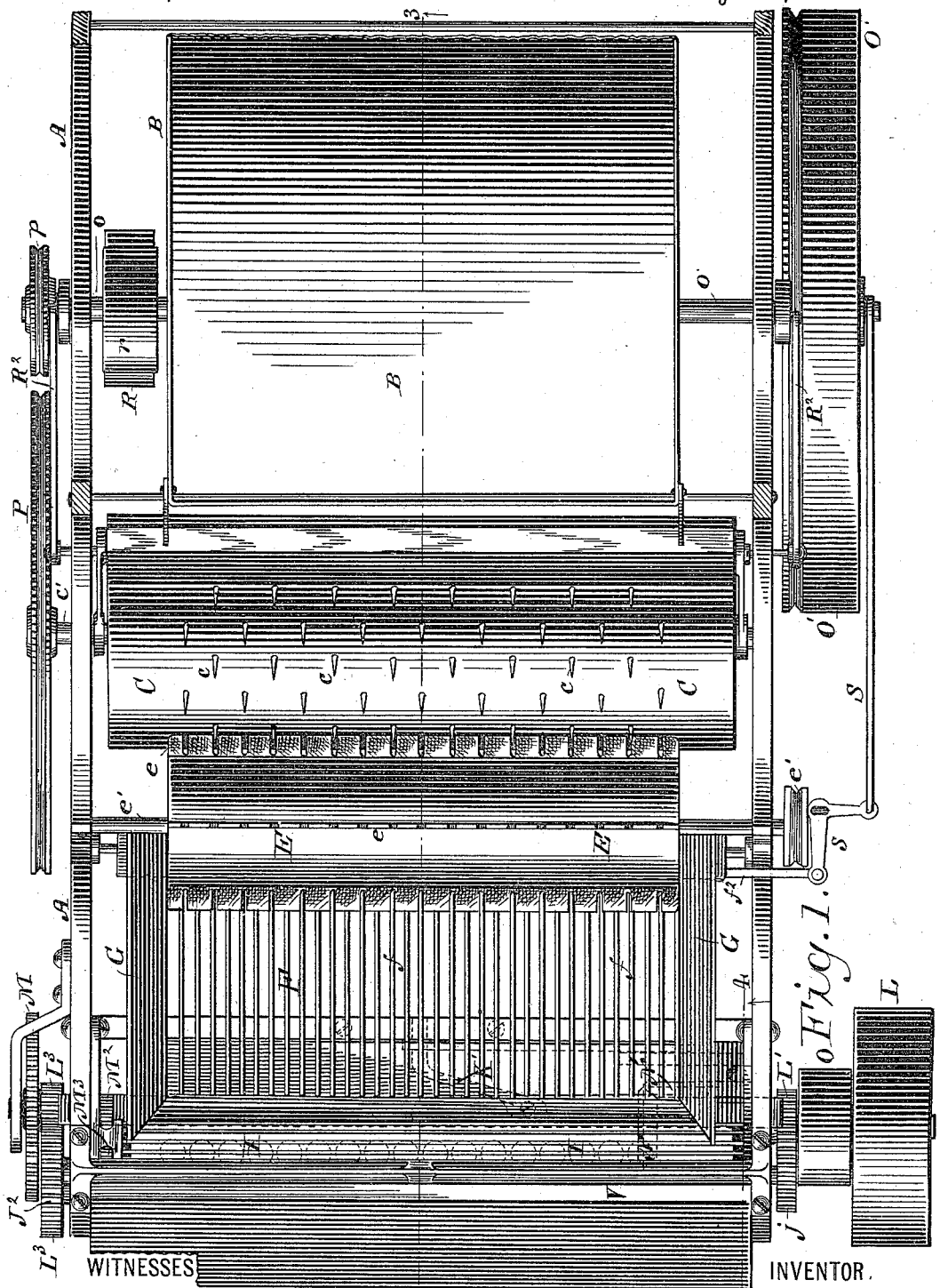

(No Model.) 5 Sheets—Sheet 1.

J. R. MONTAGUE.
MACHINE FOR OPENING, CLEANING, AND GINNING SEED COTTON.

No. 383,754. Patented May 29, 1888.

WITNESSES
H. C. Newman
Ed. A. Newman.

INVENTOR.
John R. Montague
By his Attorneys
Baldwin Hopkins & Peyton.

(No Model.) 5 Sheets—Sheet 2.

J. R. MONTAGUE.
MACHINE FOR OPENING, CLEANING, AND GINNING SEED COTTON.

No. 383,754. Patented May 29, 1888.

WITNESSES. INVENTOR.
H. C. Newman. John R. Montague,
Ed. A. Newman. By his Attorneys
Baldwin Hopkins & Peyton.

(No Model.) 5 Sheets—Sheet 3.

J. R. MONTAGUE.
MACHINE FOR OPENING, CLEANING, AND GINNING SEED COTTON.

No. 383,754. Patented May 29, 1888.

WITNESSES.
H. C. Newman,
Ed. A. Newman,

INVENTOR.
John R. Montague,
By his Attorneys
Baldwin Hopkins & Peyton.

(No Model.) 5 Sheets—Sheet 4.

J. R. MONTAGUE.
MACHINE FOR OPENING, CLEANING, AND GINNING SEED COTTON.

No. 383,754. Patented May 29, 1888.

WITNESSES.
H. C. Newman,
Ed. A. Newman,

INVENTOR,
John R. Montague,
By his Attorneys
Baldwin Hopkins & Peyton.

(No Model.) 5 Sheets—Sheet 5.
J. R. MONTAGUE.
MACHINE FOR OPENING, CLEANING, AND GINNING SEED COTTON.
No. 383,754. Patented May 29, 1888.
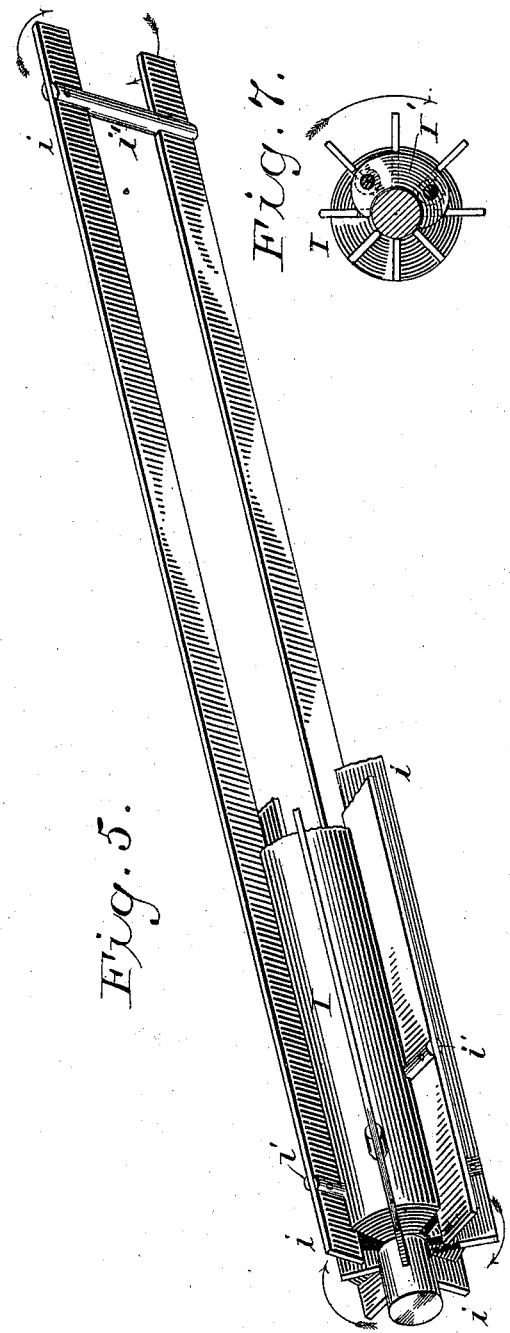
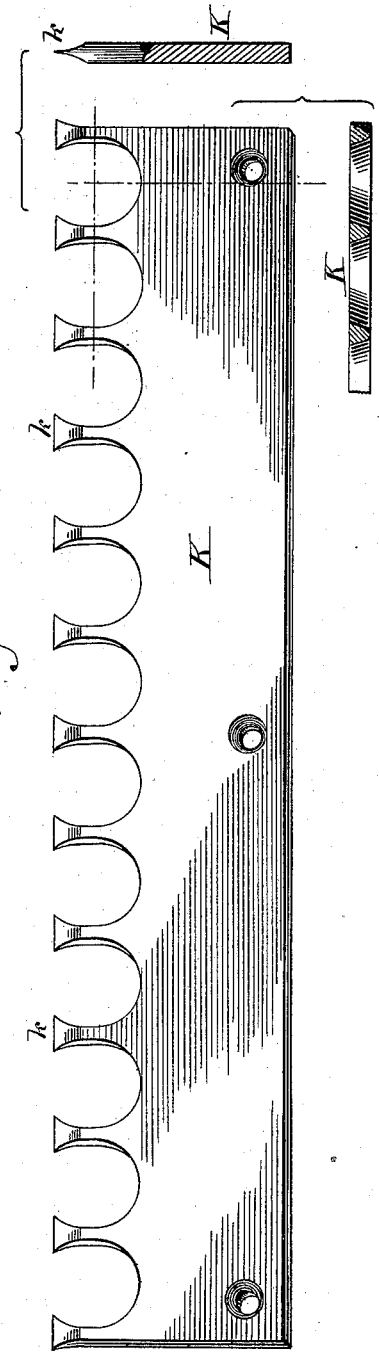
WITNESSES.
H. C. Newman,
Ed. A. Newman,
INVENTOR.
John R. Montague,
By his Attorneys
Baldwin Hopkins & Peyton.
N. PETERS, Photo-Lithographer, Washington, D.C.

UNITED STATES PATENT OFFICE.

JOHN R. MONTAGUE, OF AUBURN, NEW YORK, ASSIGNOR TO THE MONTAGUE ROLLER COTTON-GIN COMPANY, OF TOLEDO, OHIO.

MACHINE FOR OPENING, CLEANING, AND GINNING SEED-COTTON.

SPECIFICATION forming part of Letters Patent No. 383,754, dated May 29, 1888.

Application filed October 8, 1887. Serial No. 251,848. (No model.)

*To all whom it may concern:*

Be it known that I, JOHN R. MONTAGUE, a citizen of the United States, residing at Auburn, in the county of Cayuga and State of New York, have invented certain new and useful Improvements in Machines for Opening, Cleaning, and Ginning Seed-Cotton, of which improvements the following is a specification.

My invention more especially relates to that class of machinery for treating seed-cotton known as the "roller-gin."

The first part of my invention relates to the method of feeding the seed-cotton from the hopper to the gin. Its object is to open the cotton-boll as it passes from the hopper and draw out its fiber, so as to facilitate its subsequent treatment. This end I attain by combining with the hopper traversing teeth or hooks and a card having a vibrating or reciprocating motion relatively to the teeth or hooks, which organization prevents the clogging of the bolls in said hopper and withdraws, separates, and spreads out its fibers.

The next part of my invention relates to the manner of cleaning the seed-cotton as it passes from the hopper, to which end my improvement consists in combining with the hopper, traversing teeth, and reciprocating card a roller provided with wings or beaters revolving in proximity to but more rapidly than the teeth, so as to beat out dust and other impurities. This roller also serves to clear the traversing drawing-hooks above mentioned.

My improvement further consists in combining with the hopper, traversing drawing-teeth, reciprocating card, and clearing-roller, above mentioned, a laterally-reciprocating grating arranged beneath the teeth and clearing-roll, upon which grating the seed-cotton falls on its way to the ginning apparatus, and through which grating the dust and other impurities drop.

The next part of my invention relates to the mechanism for feeding the seed-cotton to the ginning-rolls, and for ginning it, to which end my improvement consists in combining rollers, of any suitable material, of comparatively small diameter, rotating in close proximity to each other, between which the ginned cotton passes, with a feed-roller arranged parallel therewith containing parallel longitudinal radially-reciprocating ribs, which are alternately thrust out to seize and carry the cotton to the rolls at a regulated speed, and then are retracted to allow the seed-cotton to pass freely to the rolls. By this means the feed-roll is enabled to run close to the ginning-rolls, and to avoid drawing the cotton away from the rolls.

My invention further consists in combining with the ginning-rolls and feed-roll, above described, seed-separating teeth reciprocating longitudinally in the bite of the rolls, parallel therewith, to detach the seed from the lint as the latter is drawn through the rolls.

My invention further consists in combining with the ginning-rolls, feed-roll, and reciprocating teeth a guide-plate partially encircling the feed-roll and in such relation thereto as to enable the radially-reciprocating ribs to properly seize, hold, and deliver the seed cotton to the ginning-rolls.

My invention relates to further details and organization of the apparatus employed, hereinafter described, and designated in the claims at the end of this specification.

The accompanying drawings represent all the improvements herein claimed as embodied in one apparatus in the best way now known to me. Some of them, however, may be used without the others, and in machines differing in their details of construction from those herein described.

Figure 2:
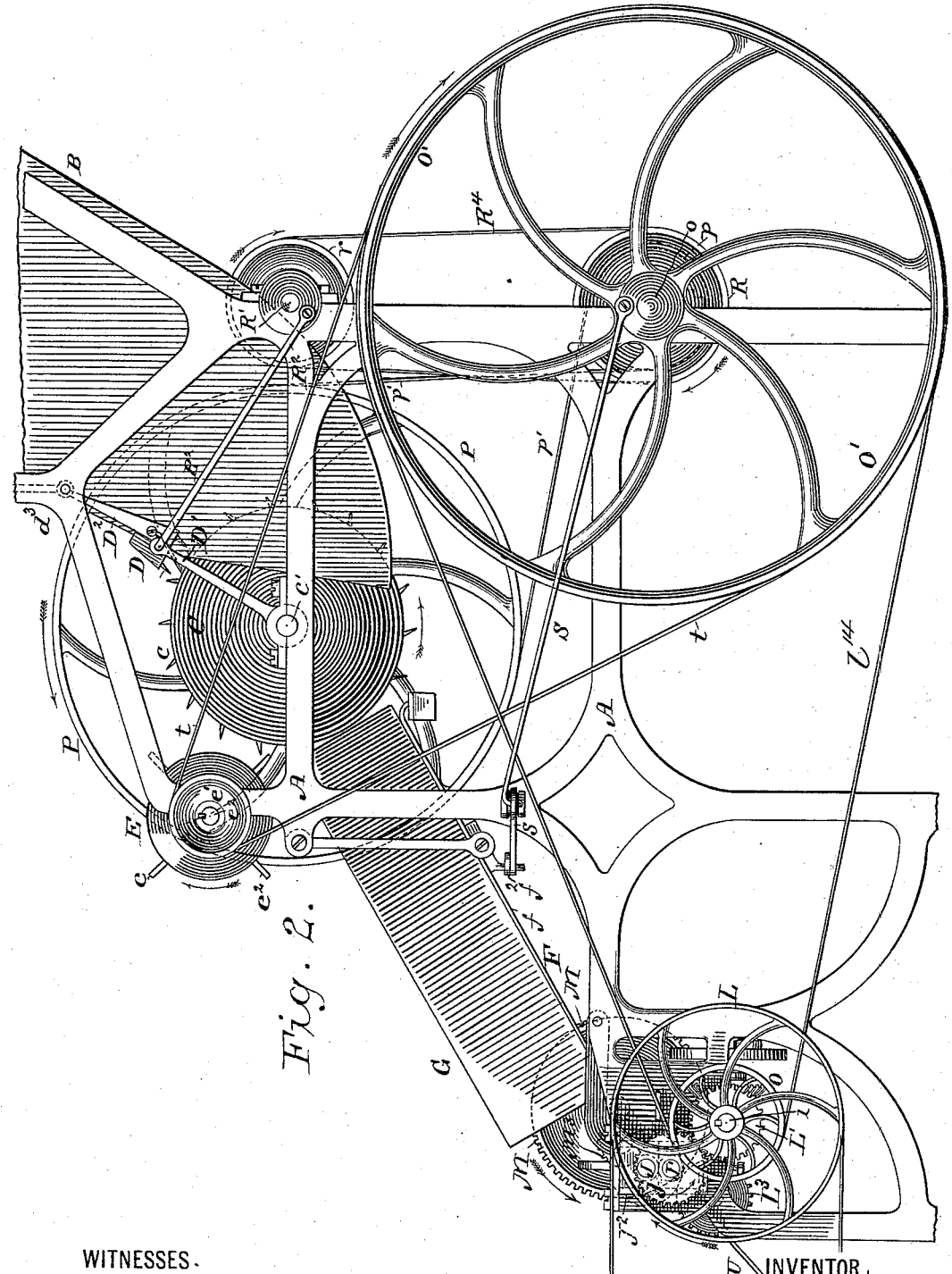
Figure 3:
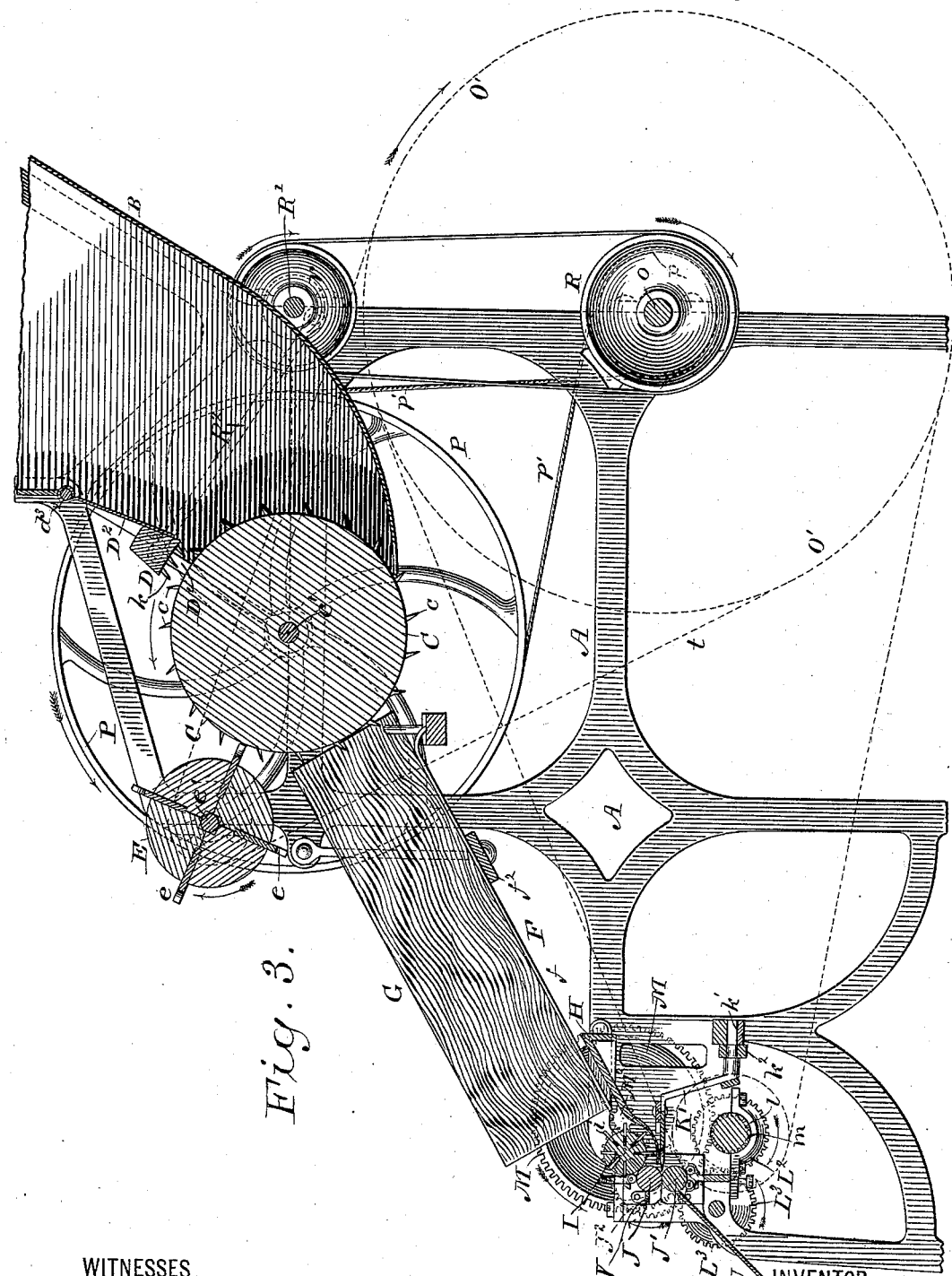
Figure 4:
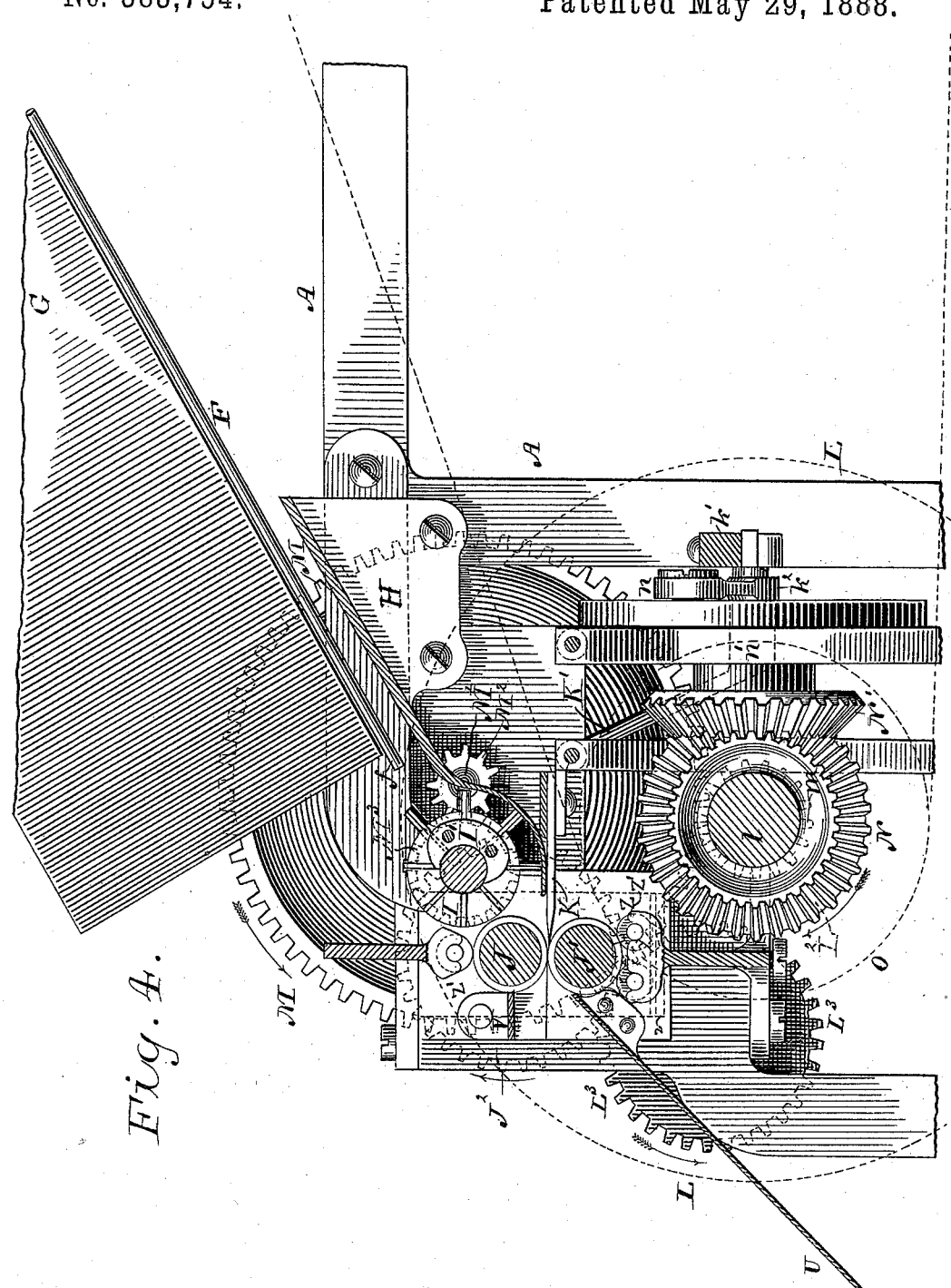

Figure 1 represents a plan or top view of my improved machine; Fig. 2, a side elevation thereof; Fig. 3, a longitudinal central section and elevation thereof on the line 3 3 of Fig. 1. Fig. 4 is a similar section through the feeding and ginning mechanism on the line 4 4 of Fig. 1, on an enlarged scale. Fig. 5 is a perspective view of the feed-roller with parts broken away. Fig. 6 shows perspective and sectional views of the clearing and seed-removing teeth; and Fig. 7, a transverse section through the feed-roller, showing the cam which reciprocates its blades, ribs, or teeth.

That portion of the machine into which the seed-cotton is fed I call the "front" of the machine, the other part the "rear." That side on the left of a person facing the front part of the machine I call the "left" side, the other the "right."

The mechanism is shown as mounted in a main frame, A, of suitable material and well-known construction. The seed-cotton is contained in a hopper, B, open at top and in the rear, but closed on its other sides, the front end of which is preferably inclined backward and downward, so as to cause the seed-cotton naturally to be fed backward toward the ginning apparatus. The lower rear part of the hopper is closed by a series of traversing teeth, $c$, in this instance shown as mounted on a roller, C, revolving in suitable bearings in the frame, the teeth being slightly inclined forward in the direction of their rotation, which is such that they traverse from the bottom toward the top of the hopper. The function of these teeth is to draw, open, or spread the bolls, to prevent their being fed to the rollers in lumps or masses, and to facilitate the subsequent operation of cleaning. This operation is facilitated by suspending a card, D, in or about the line of the hopper and above the rear of the drawing-roller, which card retains and draws out the bolls, preventing them from being carried forward in a mass. To prevent the clogging of this card, a short reciprocating or vibratory movement concentric with the axis of the drawing-roller C is imparted to it. This is represented as accomplished in this instance by mounting the card on radial arms D', pivoted on the axis of the drawing-roller and vibrating said arms by a crank and pitman from a counter-shaft, R'. A shield, $D^2$, is pivoted at its upper end, $d^3$, to the frame, its lower end being loosely connected with the reciprocating card, so as to vibrate with it. The function of this shield is to prevent matter being thrown over back of the card by the drawing-roller. The seed-cotton, after being thus separated and drawn out by the action of the card and drawing-roller, is carried round by the latter until it comes in contact with a beater, E, consisting of a roller provided with wipers $e$, and mounted in a frame on an axis parallel with that of the drawing roller, preferably of smaller diameter and revolving at a higher rate of speed, so as not only to beat, sweep, or clear the seed-cotton from the teeth of the drawing-roll, but to beat out dust or other impurities which drop down through a grating, F, arranged beneath it. This grating consists of parallel bars or rods $f$, inserted longitudinally of the machine in a frame, to which a laterally-reciprocating motion is imparted in well-known ways, as hereinafter described. The bars are inclined from front to rear, so as to gradually feed the seed-cotton to the ginning-rolls. A suitable casing or shield, G, prevents dust and lint from being thrown out by the beater.

A stationary guide or concave, H, preferably of metal, is secured to the frame underneath the rearward portion of the reciprocating grating, inclined backward and downward, and extends underneath the feed-roller I, around the lower part of which it concentrically curves. This feed-roller is mounted in suitable bearings in the frame, revolving parallel and in close contact with the ginning-rolls. Its details of construction are shown in Figs. 3, 5, and 7. It is shown in this instance as provided with eight radial slots, in which ribs or bars $l$ reciprocate freely transversely to its axis, these bars being connected by cross-pieces $i'$, so that as a bar is protruded on one side of the roller it is correspondingly retracted on the other. This movement is effected by a suitably-constructed cam, I', secured to the frame near the edge of the roller, and bears against the inner sides of the projecting ends of the ribs. As the roller revolves, the ribs are successively protruded on one side of the roller, while the ribs on the opposite side are retracted. The retraction of the ribs is effected by the cross-pieces $i'$, which connect opposite ribs, so that as one rib is protruded it draws with it or retracts into the body of the roller the opposite rib. The shape and relative position of the cam I' are shown in Fig. 7.

Ginning-rolls J J', made of any suitable well-known material, are arranged to revolve parallel with and close to each other and to the feed-roll I, the latter, however, being above the line of nearest approximation of the two rollers.

I have used disks of leather arranged side by side and compressed so as to form rollers with good success. A roller similarly constructed of rawhide disks would also answer a good purpose.

The ginning rollers are intended to revolve in contact with each other, but are mounted in bearings Z. (Shown by dotted lines in Fig. 4.) The bearing-blocks are preferably mounted on elastic cushions $z$, so as to give the blocks a slight play for the passage of the lint when required. The rollers are preferably made of comparatively small diameter. One of them at least should not exceed five-eighths of an inch in diameter. Undue springing or yielding of the rollers is prevented by intermediate anti-friction bearings, Z', at suitable intervals. The yielding bearings and the anti-friction devices are of well-known construction and need no further description. These ginning-rollers should run at a much higher speed than the feed-rollers—say ten or fifteen times as fast.

A series of ginning or seed-extracting teeth, $k$, are shown as mounted on a plate or bar, K, reciprocating laterally with its teeth or points in close approximation to the bite of the ginning-rollers, as shown in Fig. 4. The preferred form given to these teeth is shown in Fig. 6. They are preferably made about three-quarters of an inch from center to center and with about five-eighths of an inch aperture, with their points comparatively sharp or chisel-shaped, and somewhat broader than their necks, to conform to the bite of the rolls, into which they should enter deeply. They are slightly undercut, as shown in the sectional part of Fig. 6, so as to tend to ride over and press down the seed without cutting them.

I will now proceed to describe the gearing herein shown, but do not limit my claims to the specific organization represented, as that may be changed in various well-known ways without departing from the principle of my invention.

A driving-shaft, $l$, mounted in suitable bearings in the frame, carries a pulley, L, driven by a belt from any suitable motor. A spur-gear, L', on this shaft drives a corresponding gear, $j$, mounted on the axis of the lower ginning-roll. A corresponding spur-pinion, L², on the right hand or opposite end of the driving-shaft, engages with an idle-wheel, L³, which in turn drives a spur-wheel, J², on the right-hand end of the upper ginning-roll, by which means the rolls are caused to revolve in opposite directions. A small pinion, $m$, on the driving-shaft meshes with a large spur-gear, M, mounted on the right-hand side of the frame on a short shaft, M', which carries on its inner end a small spur-gear, M², which engages with a corresponding pinion, M³, on the shaft of the feed-roll I. Under the organization described the ginning-rolls traverse with equal speed at their points of contact, whatever may be their relative size, while a much slower motion is imparted to the feed-roll, which traverses about twelve times slower than the ginning-rolls. The ribs of the feed-roll are reciprocated at suitable intervals by cams I', secured to the frame near each end of the roller. The details of the roller are shown in Figs. 4 and 7. The reciprocating teeth $k$ are mounted on a bar, K. A bar, K', rigidly connected with this arm, extends downward and forward, its end reciprocating in a guideway, $k'$, in the frame. This arm is driven by a pitman, $k^2$, and a crank, $n$, mounted on a shaft, $n'$, carrying a bevel-gear, N', meshing with a bevel-pinion, N, on the driving-shaft. A belt, $l^4$, from a pulley, O, on the main shaft encircles a pulley, O', on a counter-shaft, $o$, in the front of the frame. A small pulley, $p$, on the counter-shaft $o$ by means of a cross-belt, $p'$, drives a corresponding large pulley, P, on the shaft $c'$ of the roller C, thus giving it the required rotation. A pulley, R, on the shaft $o$, by means of a belt, R⁴, drives a corresponding pulley, $r$, on a crank-shaft, connected at each end by a pitman, R², with the radial arms D' of the reciprocating card, to give it the proper motion. A pitman, S, is pivoted at one end to the band-wheel O' on the counter-shaft $o$ and at the other to a bell-crank, $s$, connected by a connecting-rod, $f^2$, with the laterally-vibrating grating F, to give it the required movement. A belt, $t$, passing around the inner side of the large band-wheel O' on the counter-shaft $o$, drives a pulley, $e'$, on the beater-shaft $e^2$, to give it the required movement.

The arrows indicate the direction of the movement of the various parts of the gearing.

The following is a description of the operation of the machine. Seed-cotton fed into the hopper is seized by the traversing teeth on the roller C and carried upward underneath the reciprocating card D, which tends to open out the bolls and spread the material over the roller in a thin layer, which is carried around until it comes under the operation of the rapidly-revolving beater E, which beats out dust and other impurities, clears the seed-cotton from the teeth on the rolls C, and throws it down upon the vibrating grating F, down which it slides, and drops into the space between the concave and the feed-roller I. The latter is so arranged, as described, that at this portion of its movement its blades are protruded in moving downward, carrying the seed-cotton with them at a definite rate of speed, and at the same time preventing it from traveling faster than the blades. As the latter push the seed-cotton into the bite of the seed-rolls, they are retracted and move up out of the way, leaving the space clear. The reciprocating rake or teeth $k$ play underneath and in rear of the rear part of the concave, and seize the seed as the lint is drawn through between the ginning-rolls, which seed drop down in the space between the teeth, and are conducted to any suitable receptacle. The ginning-rolls, moving more rapidly than the feed-roll, tend to draw the fibers away from the seeds, which are thus thoroughly cleaned by the conjoint operation of the feed-roll, the reciprocating teeth, and the ginning-rolls. The lint, after passing through the ginning-rolls, slides down an incline, U, to any proper receptacle. A guard consisting of a blade, V, arranged with one edge parallel with and close to the upper ginning-roller, prevents lint from being carried up and wound around the rolls in that direction.

I have obtained good results by reciprocating the rake or ginning teeth once to each revolution of the rolls with short staple cotton; but the relative velocity of the ginning-rolls and rake should be varied according to the length of the staple. For instance, the longer the staple the slower the rake movement, and vice versa.

Having thus fully described the organization and operation of my improved machine for opening, cleaning, and ginning seed-cotton, what I claim in said machine as new, and desire to secure by Letters Patent, is—

1. The combination, substantially as hereinbefore set forth, of the hopper, the traversing drawing-teeth, means for actuating them, the cleaning-card, its supports pivoted concentrically with the axis of movement of the drawing-teeth, and means for reciprocating the cleaning-card, whereby it is caused to travel in a path parallel with the actuating-surface of the drawing-teeth to open the bolls and draw out the fibers.

2. The combination, substantially as hereinbefore set forth, of the hopper, the traversing drawing-teeth, means for actuating the drawing-teeth, the reciprocating card, means for reciprocating the card over the drawing-teeth in an arc coinciding with the line of movement of the drawing-teeth, the beater or cleaning roller arranged in rear of the drawing-teeth, and means for driving the beater or cleaning roller faster than the drawing-teeth to clear the latter, as well as beat out the dust, &c.

3. The combination, substantially as hereinbefore set forth, of the hopper, the traversing drawing-teeth, means for actuating the drawing-teeth, the cleaning-card arranged over the drawing-teeth, means for actuating the card, the beater or cleaning roller, means for actuating it, the laterally-reciprocating grating upon which the seed cotton falls after being acted on by the beater, and means for reciprocating the grating.

4. The combination, substantially as hereinbefore set forth, of the feed-roll having radially-reciprocating ribs to grasp and retard the seed-cotton and insure its regular delivery to the ginning-rolls, means for actuating the ribs, the ginning-rolls arranged in close proximity to the feeding-roll to receive the seed-cotton therefrom, and means for actuating the ginning-rolls.

5. The combination, substantially as hereinbefore set forth, of the feed-roll having radially-reciprocating ribs to grasp and retard the seed-cotton and insure its regular delivery to the ginning-rolls, means for actuating the ribs, the ginning-rolls arranged in close proximity to the feeding-roll to receive the seed-cotton therefrom, means for actuating the ginning-rolls, the seed-separating teeth or rake reciprocating longitudinally between the ginning-rolls, and means for actuating the rake.

6. The combination, substantially as hereinbefore set forth, of the ginning-rolls, the feed-roll having radially-reciprocating ribs, means for actuating the ginning-rolls, feed-roll, and the ribs, the laterally-reciprocating seed-separating teeth, means for actuating the teeth, and the concave or guide plate concentrically surrounding the lower front portion of the feed-roll to facilitate the grasp of its reciprocating ribs on the seed-cotton.

7. The combination, substantially as hereinbefore set forth, of the ginning-rolls, means for actuating the rolls, the feed-roll, its radially-reciprocating ribs or blades, means for actuating the roll and its ribs or blades, the concave partially encircling the feed-roll, the seed-separating teeth reciprocating between the concave and the ginning-rolls, means for actuating the teeth, the grating over which the seed-cotton passes to the concave and feed-roll, and means for reciprocating the grating.

8. The combination, substantially as hereinbefore set forth, of the ginning-rolls, the feed-roll, means for actuating the ginning-rolls and feed-roll, the concave under the feed-roll, the laterally-reciprocating separating-teeth, means for actuating them, the laterally-vibrating grating, the traversing drawing-teeth, the beater-roll, and means for actuating the grating, drawing-teeth, and beater-roll.

9. The combination, substantially as hereinbefore set forth, of the ginning-rolls, the feed-roll, means for actuating the ginning-rolls and feed-roll, the concave arranged under the feed-roll, the separating-teeth, the grating, the beater-roll, the traversing drawing-teeth, reciprocating card, means for actuating the separating-teeth, grating, beater-roll, and drawing-teeth, and the hopper.

In testimony whereof I have hereunto subscribed my name.

JOHN R. MONTAGUE.

Witnesses:
LLOYD B. WIGHT,
W. CLARENCE DUVALL.